INVENTOR.
Paul D. Wurzburger
BY

ATTORNEYS

March 18, 1958   P. D. WURZBURGER   2,827,007
METHOD OF MAKING WROUGHT FITTINGS
Original Filed Aug. 23, 1947   2 Sheets-Sheet 2

INVENTOR.
Paul D. Wurzburger
BY
ATTORNEYS

2,827,007

METHOD OF MAKING WROUGHT FITTINGS

Paul D. Wurzburger, Cleveland Heights, Ohio, assignor to NIBCO, Inc., a corporation of Indiana Original application August 23, 1947, Serial No. 770,293, now Patent No. 2,603,175, dated July 15, 1952. Divided and this application June 11, 1952, Serial No. 292,783

9 Claims. (Cl. 113—44)

This invention relates to metal working and more particularly to improved methods of forming wrought T fittings, crosses or other branch fittings from tubular stock.

This application is a division of my co-pending patent application entitled Method and Means for Making Wrought Fttings, Serial No. 770,293, filed August 23, 1947 (now Patent 2,603,175).

My invention may be considered in general as an improvement upon prior methods in which a tubular blank is subjected to the combined forces of filler material under pressure and direct axial compression which cause the metal to flow and form the desired hollow branch fitting. In such a forming process the volume of the resultant fitting is smaller than the volume of the original blank. At least in part this shrinkage in volume is due to the tendency of the metal walls to become thicker.

When such a diminution in volume of a fitting results during the forming operation, the pressure of the filler material, which is usually virtually incompressible tends to increase beyond bounds. The result is the bursting strength of the fitting is exceeded and any unsupported portion of the blank tends to rupture. This can be obviated by relieving the pressure of the filler material before it can reach this upper limit.

Several methods of the prior art attempt to provide for pressure relief by permitting liquid filler material to escape from the partially wrought blank by means of preloaded relief valves. Because of the inertia effects inherent in such a method of pressure relief, the internal fluid pressure is subject to undesirable and abrupt variations, making control of the forming operation difficult if not impossible. Delayed pressure relief invites momentarily high pressures which often are destructive; over-relieving results in loss of pressure when the same is needed for proper forming of the fitting. The surges in pressure resulting from the use of relief valves are therefore to be avoided if consistently satisfactory results to be achieved.

Another proposed solution to the problem suggests the use of a plastic filler material of high viscosity such as lead with a provision for pressure relief by permitting excess material to escape from the blank through a perforation in the wall, such perforation being located where the end of the lateral branch is to be formed. This expedient is disadvantageous in commercial production for the loading of such a perforated blank is inconvenient, and, what is more important, it is very difficult to maintain correct internal fluid pressures when a portion of the filler material can escape outwardly without an opposing pressure to set a lower limit to the internal filler pressure. Another drawback to the use of a perforated blank is that the perforation tends to tear, especially if the edges are ragged, causing injury to the fitting and complete loss of control over the forming operation.

Yet another proposal to meet the problem of diminishing volume is to prevent wall thickening by supporting the blank positively during the forming operation by internal supporting plugs. This proposal is impracticable for commercial production; for, first, it is difficult if not impossible to prevent thickening of the wall of the blank at the zone where the intercommunicating branches intersect. Secondly, if loosely fitting plugs are used the metal will first thicken to fill the clearance between the plug and the blank, and thirdly, the use of closely fitting plugs presents difficulties of insertion into and removal from the blank.

A general object of my invention is to provide methods and means for forming hollow tubular fittings such as T-fittings or the like in which the difficulties of the prior art described above are substantially overcome. It is therefore among the objects of my invention to provide a method for making such fittings out of tubular stock by creating desirable internal filler pressures in the blank throughout the forming operation. More specifically it is an object to provide that the rate of displacement of filler material be kept in harmony with the rate of change in volume of the blank or piece during the working operation as by working the filler at a rate in relation to the rate of working the piece that is proportional to the rate of diminution of volume of the blank from initial to final form.

Another object is to provide a filler material of novel and advantageous properties which can be handled, inserted into and removed from the work piece and/or can be precompressed in the work piece and which is readily soluble in water; which has a low melting point so that no problem of amalgamation or cleaning is involved and which has desirable lubricating and viscosity properties.

These and other objects and advantages of my invention will more fully appear from the following description of certain preferred and modified forms thereof reference being had to the accompanying drawings in which.

Exemplary forms of my invention contemplate forming branch fittings by applying forming pressures directly upon the end of a tubular blank and also applying pressure upon substantially incompressible filler material confined within the blank in relative amounts and rates which produce desirable flow and working of the metal. I prefer that filler material pressures will remain desirably high but below the bursting strength of the blank adjacent the weakest point thereof. Also I prefer that a preliminary pressure be built up in the filler material prior to the exertion of metal flowing pressure upon the ends of the blank so that the filler material will tend to act incompressibly during the working of the blank. Precompression of the filler may also tend to stress at least that portion of the blank adjacent the branch to be formed before or possibly simultaneously with the working of the blank in response to pressure exerted directly upon the ends thereof.

Throughout the following description and illustration of preferred and modified forms, embodiments and practices of my invention specific reference is largely confined to the making of the T forms of branched fittings, and the same is not to be taken by way of limitation but rather by way of exemplification of the principles of my invention as the same may be applied with like facility to the making of crosses and other branch forms not so specifically illustrated and described.

Figure 1:
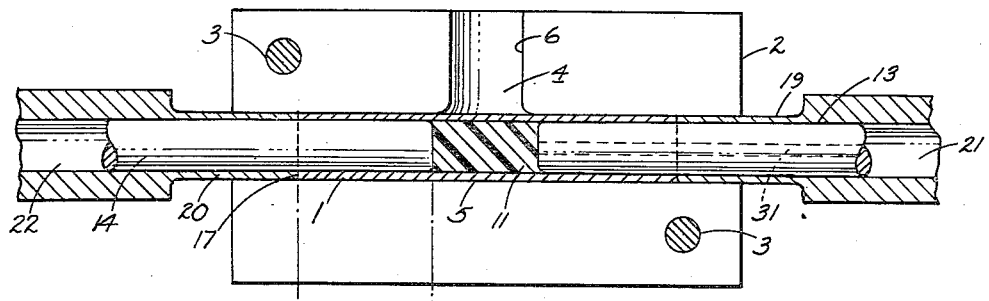
Figure 1 is a longitudinal sectional partially fragmentary and partially diagrammatic view of a tubular blank and forming apparatus at the beginning of the forming operation according to a preferred form of my invention.
Figure 2:
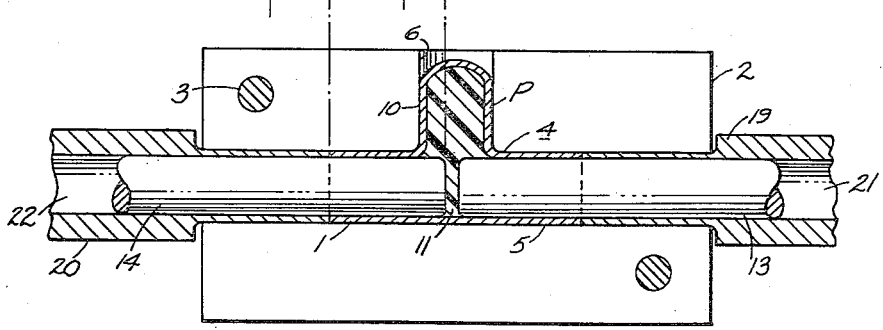
Figure 2 is a view similar to that of Figure 1 showing the end of the forming operation.
Figure 3:
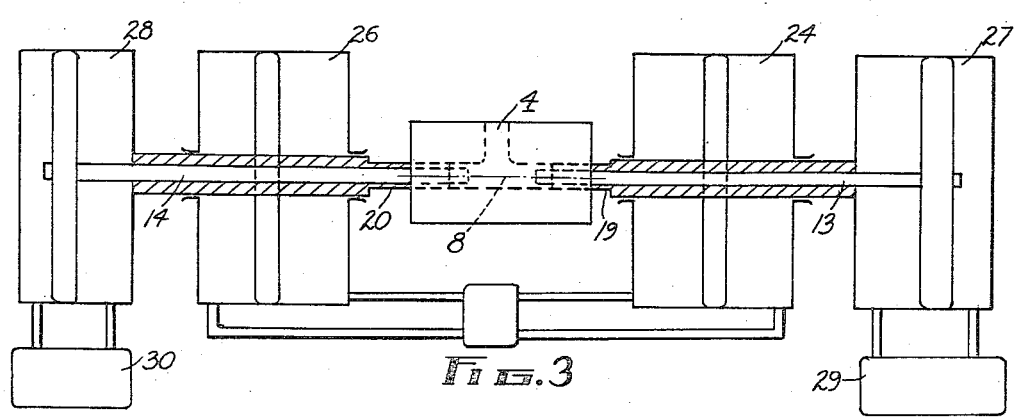
Figure 3 is a diagrammatic view of an arrangement of the forming apparatus.

Referring now to Figures 1, 2, and 3 of the drawings the tubular blank 1 preferably in the right circular cylindrical form of the metal or alloy to be worked is disposed in the sectional die 2, one half only being shown, which with its companion half not shown provides a suitable T-shaped channel 4 comprising a head portion 5 and a lateral branch or leg portion extending at right angles thereto; the tubular blank 1 being initially disposed in the head portion 5 of the channel as shown in Figure 1. The die may be divided along any one of several parting lines but I find it advantageous to split it longitudinally and symmetrically as shown, using centering pins 3 to align the separate halves, although the die might be split through the head portion of the channel in a plane normal to the branch 6 substantially along the line 8 as suggested in Figure 3 if that were desired.

The tubular blank preferably comprises workable metal such as fairly soft copper, aluminum, mild steel or other metals or alloys which will flow easily and which are extrudable under the influences and conditions to be hereinafter more fully set forth. The efficacy of my invention admits of the use of other desirable metals and materials, the working of which has been regarded as too difficult for practicability. It will be understood that the split halves of the die 2 may be opened and closed to permit the insertion of the blank 1 in the first instance and the removal of the wrought piece P by suitable opening, closing and clamping mechanisms which are known in the art but which are not specifically shown herein. The wrought piece P is shown in Figure 2 at the completion of the working thereof; the ends of the tubular blank 1 having been forced toward each other and the branch or leg 10 having been forcibly extruded into the branch channel 6 of the die as a result of the working presently to be more fully described.

As indicated above the practice of my invention includes the employment of filler material 11 disposed interiorly in the tubular blank 1 in the first instance and thereafter forcibly constrained to flow from its original position into the leg portion 10 of the piece as suggested by comparison of Figures 1 and 2. The filler material that I prefer to employ is characterized by its ability to flow or spread under pressure by that degree of fluidity, elasticity or viscosity most suitable for working different metals or alloys for the practice of the different forms of my invention presently to be described and by the ease with which it may be formed for use with the tubular blank and the ease with which it may be removed from the work piece. While I do not disclaim the use of filler materials ranging from liquids to lead, lead alloys, Woods metal, wax and the like in the practice of specific forms of my invention for such specific utility as may be had from such filler materials, my preference is to use one or another of the polyethylene glycols or mixtures thereof having the characteristics of fluidity, viscosity, strength or weakness that coacts most efficiently in the form of method employed and with the material to be worked.

The polyethylene glycols of the general formula HO CH$_2$(CH$_2$OCH$_2$)$_{2+x}$CH OH having molecular weights of the order of about 1000 to about 7000 are wax-like solids whose melting points and viscosity increase substantially in proportion to their molecular weights and whose solubilities in water or organic solvents are roughly inversely proportional to their molecular weights. Polyethyleneglycol having an average molecular weight of about 3000 is a hard translucent wax-like solid somewhat resembling paraffin wax in appearance and texture, which is soluble in water and which has a melting point around 50° C. When its molecular weight is increased to between 6000 and 7500 the melting point increases to about 58 to 62° C. It is still soluble in water and its viscosity is substantially increased. Below an average molecular weight of about 700 the polyethylene glycols are liquids at room temperature. Within this range of choice from among the polyethylene glycols and mixtures thereof a number of advantages persist, namely, the fact that the filler may be very easily removed from the finished work piece by virtue of its solubility in water or other solvents at room temperature or alternatively by melting the filler at low temperatures which are harmless to the metal of the finished piece. Moreover the polyethylene glycols do not "tin" the interior of the work piece nor do they leave insoluble residues which must be removed as by detinning, de-greasing or de-waxing as is often the case with other known filler materials. Moreover the polyethylene glycols particularly in the range of molecular weights from about 1000 to 7000 have advantageous lubricating qualities which assist in the extrusion operation and facilitate the flow of metal and the flow of the filler material during the working of the blank. The filler material of my preference may be cast directly into the blank or the mid-portion thereof as shown in Figure 1, or alternatively it may be pre-cast or otherwise formed into slugs or pellets of a desired size suitable for manual insertion into and fit within the tubular blank.

As shown in Figures 1 and 2, I prefer to employ a quantity of filler material 11 not greatly in excess of the volume of the lateral branch or branches that are to be extruded or formed from the tubular blank such as the branch or leg 10 shown in Figure 2. I find it desirable to use a minimum volume of filler material sufficient to fill substantially only that middle portion of the blank which is to be worked rather than any greater portion of length for a number of reasons. Firstly, the cost and expense of handling and recovering filler material is reduced. Secondly, it is practicable and at all times advantageous to support those portions of the blank which are not worked or not substantially worked by rams such as the rams 13 and 14, shown in Figures 1 and 2, which have a close sliding fit with the internal surface of the blank and constrain these so-called unworked portions of the blank to their desired size and shape more efficiently in many instances than filler materials whose characteristics may be best selected for the specific purpose of working the work parts of the material of the finished piece. Moreover by using substantially the minimum volume of filler material, I am able to create and maintain a much more nearly uniformly desirable pressure throughout the whole of the filler material than would otherwise be the case especially where it is desirable to use a filler material of high viscosity in which a large pressure gradient would be developed between the ends where pressure is applied by the mandrels and the mid-portion where pressure is sought to be developed between the filler material and the portion of the blank to be worked.

In this preferred form of my invention I provide two oppositely acting hollow plungers 19 and 20 arranged to engage the opposite ends of the blank 1 and exert the necessary forming and extruding pressures thereupon. Preferably those portions of the ends of the plungers 19 and 20 that enter the ends of the head part 6 of the channel of the die have a close sliding fit therewith and these portions of the plungers preferably have a wall thickness substantially equal to the wall thickness of the tubular blank 1. The hollow plungers 19 and 20 have straight cylindrical bores 21 and 22 of approximately the same diameter as the internal diameter of the blank 1 within which bores, rams 13 and 14 are independently slidably movable in a close sliding and mutually supporting fit therewith. The rams 13 and 14 also have a close sliding fit with the interior of the blank of the work piece wherewith to be movable thereinto and, in the first instance, Figure 1, engage the filler material between their opposed ends and at all times confine the filler material to the space between their opposed ends in the middle portion of the blank and/or the extruded leg as the size of that space is determined by the position and movement of the rams 13 and 14 independently of but more or less contemporaneously with the movement of the plungers 19 and 20.

As shown diagrammatically in Figure 3 fluid motors 24 and 26 are operatively connected with the plungers 19 and 20 respectively for effecting and controlling the movement thereof and fluid motors 27 and 28 are operatively connected with the rams 13 and 14 respectively wherewith the rams and the plungers may be given whatever independent or correlated movements and forces are desired. Means not shown are preferably provided to insure that the plungers 19 and 20 move toward the center of the die 2 at substantially the same speeds and through the same distances while working on the ends of the branch 1 and the strokes of the plungers 19 and 20 are centered up with respect to the die 2 wherewith the plungers will move symmetrically and simultaneously with respect to the transverse center of the die and will center the blank if the same should be placed in the die asymmetrically before the forming operation. The cylinders of the fluid motors 27 and 28 may be mounted on fixed supports or as suggested in Figure 3 may be carried on the remote ends of the plungers 19 and 20 and be movable therewith; the rams 13 and 14 being connected with the pistons of the motors 27 and 28 whereby to have movement independently of the plungers 19 and 20. The cylinders of the motors 24 and 26 are mounted on fixed supports and the pistons thereof are preferably directly connected to the plungers 19 and 20. Preferably liquids are employed in the motors 24 and 26 and appropriate hydraulic mechanisms and connections as diagrammatically indicated provide for the proper admission and discharge of fluid from the opposite sides of the pistons to obtain forcible forward and backward motions of the plungers 19 and 20 as may be desired to carry out my method. Preferably the motors 27 and 28 are pneumatic and with the aid of accumulators 29 and 30, and appropriate connections and control mechanisms, not shown, may be caused to provide substantially constant pneumatic pressure on the rams 13 and 14 for their forward strokes and such pressures as may be desired for the withdrawal strokes thereof in the sequences presently to be described.

The blank 1 being disposed in the head portion of the channel of the die as shown in Figure 1 and the die head being closed, the ends of the plungers 19 and 20 in their initial inward movement engage the ends of the blank 1 whilst the rams 13 and 14 engage the opposite ends of the body or plug of filler material 11, as shown in Figure 1, completely confining the filler material in the first instance and throughout the whole of the forming operation. As mentioned above, I prefer that the rams 13 and 14 begin to compress the filler material slightly before the power is applied to the plungers 19 and 20 to begin the working operation. The parts being substantially in the position shown in Figure 1 with the rams compressing and confining the filler material and developing therein that pressure which may be substantially maintained throughout the whole working operation, power is then applied to the plungers 19 and 20 sufficient to cause the metal of the walls of the blank to flow toward the middle thereof and into the leg branch 6 of the die until the desired amount of extrusion of the middle branch 10 of the work piece has taken place, see Figure 2. During the working strokes of the rams and plungers the speeds and movements of the pair of rams toward each other as well as the speed and movements of the pair of plungers toward each other will preferably be uniformly the same, but the relative speeds of the rams in relation to the plungers will be different so that the flow of filler material from the blank or head portion of the T into the extruded branch will never develop a deleterious high pressure nor fall below an advantageous working pressure. The average rate of inward movement of the rams will be less than the average rate of inward movement of the plungers in the same proportion that the volume of the finished work piece P bears to the volume of the blank 1. Reference to the average rates of movements or speeds of the rams of the plungers from the beginning to the ends of their working strokes contemplates that within the working strokes their particular and instantaneous speeds may depart from their average speed since at different times within a working stroke the rate of change in the volume relationship may vary and tend to create changes in pressure in the filler material. However, I have observed that it is practicable to give the rams and plungers respectively substantially constant predetermined relative speeds for their working strokes at the relative rates above mentioned as by positive linked or geared interconnection, not shown. I prefer, however, that the plungers be given the force and power required to cause the metal to flow with desirably high speed while the rams be caused to exert upon the filler material that substantially constant high pressure safely short of a bursting pressure; the summation of the efforts of both rams and plungers thus being a minimum in respect to the work that is done, i. e., the metal is worked with the least gross effort and in so doing the relative average as well as the relative instantaneous speeds of the rams compared to plungers approximates the ratio of the final volume of the piece P to the initial volume of the blank 1. Influencing the rams and plungers to have the movements and to exert the pressures mentioned above taken with the employment of a desirably small mass of filler material and with the confinement of the whole mass of filler material between the ends of the rams, not permitting any of the mass of filler to escape or be "relieved" from its confinement nor be subjected in any part to substantially less than the desired pressure during the whole time of working the piece, gives, as I have observed, most satisfactory results in a number of respects which taken collectively enhance the product and facilitate the working and making thereof. Thus the initial and continued uniform collaboration of the filler material in the working operation resists undesirable tendencies or incipient tendencies of the metal to wrinkle, thicken, thin out, burst or shear as it might and often does where the filler material is not caused to play its full and best part in relation to the forces and movements given to the ends of the blank to effect the direct working thereof by the plungers.

In this form of my invention I find it practicable to employ polyethylene glycol of the lower range of molecular weights mentioned above, i. e., of lesser viscosity since the desired flow and action of the filler material in the piece is largely characterized by the qualities of a liquid. In fact I have found it not impracticable in some instances to employ a liquid for a filler material in connection with this form of my invention, introducing liquid filler through a drilled hole 31 that may be provided for such purpose in one of the rams 13 as shown in dotted lines in Figure 1 when the parts are in substantially the position shown in Figure 1 whereupon the passage 31 would be positively closed to hold and contain the liquid filler material in the same space occupied by the plastic filler material 11 so that the liquid so introduced would play the same part and do substantially the same work in the same way as the plastic or relative solid filler material in the above described sequence of events. In other forms of my invention to be described below a higher viscosity of filler material appears as presently advised to be more desirable for reasons which will therein more fully appear. In the suggested use of liquid or low viscosity fluid filler material in the preferred form of my invention it is prudent to gain or preserve the advantages of my invention to modify the sequence of the initial application of force and movement to the rams and plungers respectively so that the wall of the blank surrounding the ends of the rams will have been compressed and thickened a little to effect a substantially fluid tight seal before fluid pressure is built up in the liquid filler that would induce a deleterious amount of leakage of filler from the blank prior to and/or in the beginning of the working strokes of the rams. Modifying the initial sequence in this way facilitates the preservation of the same or substantially the same function, mode of operation and results with respect to the work and action of the filler as that above described wherein the viscosity of the filler was taken to be such that its leakage would be negligible when the rams first developed a substantial pressure thereupon and therein prior to the thickening of the walls by the plungers to more effectively seal the space or clearance between the ends of the rams and the ends of the blank.

In this preferred form of my invention and as indicated in Figure 2 the stroke of each of the plungers from the beginning to the end of the working operation will comprise the distance S1 and the stroke of each of the rams during the same interval and operation will comprise the lesser distance S2. Since the outside diameter of each of the rams is substantially equal to the inside diameter of the blank the displacement of volume of the blank is a direct function of the stroke S1 of the plungers and the displacement of filler material is a direct function of the stroke S2 of the rams. Thus to carry out my object that the displacement of filler into the extruded leg be not excessive but on the contrary be at such a beneficient and/or relatively diminished rate in comparison with the reduction of the length of the blank, i. e., the head portion of the piece, as to preserve the extruded leg of the piece against bursting, I cause the stroke S2 of the rams to have the same proportionate relation to the stroke S1 of the plungers as the volume of the finished work piece P bears to the original volume of the blank 1. That is to say, $$\frac{S_2}{S_1} = \frac{\text{internal volume of piece P}}{\text{internal initial volume of blank 1}}$$

It also follows that the average rate of displacement of filler into the extruded leg 10 of the T is to the rate of reduction of volume of the part of the blank lying in the head of the channel of the die, i. e., the rate of reduction of volume of the head of the T as the volume of the finished piece P is to the original volume of the tubular blank 1. By either definition, assuming that the working strokes of the rams and plungers respectively begin at the same time and continue throughout the same interval of time, then as above mentioned the average speed of the rams is to the average speed of the plungers as S2 is to S1 in all cases where the rams and plungers both displace the same cross-sectional area of volume of filler and volume of tubular blank respectively.

The change or reduction in the volume or cubical content of the blank or work piece does not necessarily take place at an exactly constant rate during the working of the piece. No doubt more specific factors enter into the differences between the instantaneous rates of change of volume than I am now aware of or could profitably speculate about within the confines of this specification. Mention of a few factors will illustrate the point. For example, where the ends of the rams extend for a long distance inwardly of the ends of the blank, as shown in Figure 1, and have a snug fit with the internal surface of the blank throughout a large portion of the internal area thereof, and assuming that the external surfaces of the blank are also snugly supported in the channel of the die, these things will greatly limit or reduce that part of the loss of volume arising from the thickening of the walls of the blank especially at and adjacent the ends thereof where the ends of the plungers bear thereupon. Insofar as this rate of loss of volume tends to be rapid at the beginning of the working stroke of the plungers, this factor is much diminished in this preferred form of my invention. It may be mentioned in passing that the initial disposition of the ends of the rams as far as practicable into the blank consistent with the desired volume of filler material for the branch or branches to be extruded, goes hand in hand with the advantage and desirability of employing the minimum practicable volume of filler material.

Another factor bearing upon the instantaneous rate of change or reduction in volume of the piece is the sharpness of the corners of the intersection between the head and branch leg; the sharper and more abrupt corners tending to thicken up more than the more rounded and less abrupt corners around which the metal of the blank is caused to flow. This thickening or tendency to thicken takes place, as I believe, somewhat later in the stroke than the tendency to thicken the ends and is much reduced by the continuous and beneficient participation of the filler material in the working of the metal. Other factors, as I believe, are related to the softness, ductility and other physical characteristics of the stock of the blank as well as to the absolute speed with which the work is done. On the whole my invention tends of itself, for some or all the reasons above mentioned, and as hereinafter will more fully appear, to cause the rate of reduction of volume of the piece to be substantially uniform or more uniform than prior practice throughout the working stroke and also tends to cause the diminution or change in volume of the piece from tubular blank to finished form to be small or relatively small compared with prior practices. For these reasons it is practicable as mentioned above to drive the rams and plungers positively at predetermined rates of speed but because of variations in stock, working conditions and other things not always predictable I prefer to drive the plungers substantially positively and to drive the rams by exerting thereupon substantially uniform and constant pressure wherewith to exert substantially constant pressure on the filler and permit relative, if only minute, changes in the differences of the speeds of the rams and plungers.

Figure 4:
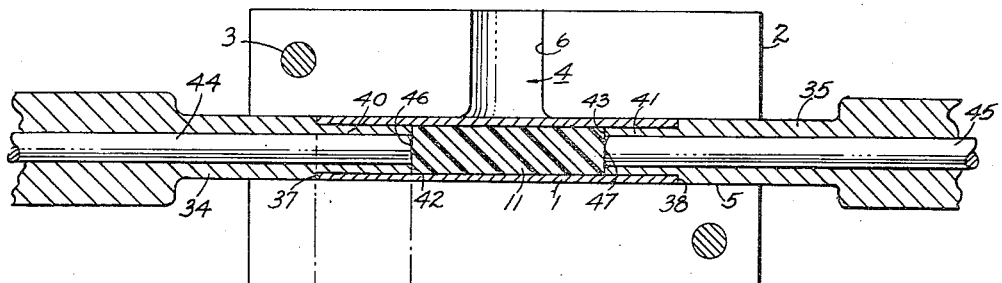
Figure 4 is a view similar to Figure 1 of a modified form of my invention with the apparatus showing the beginning of the forming operation.
Figure 5:
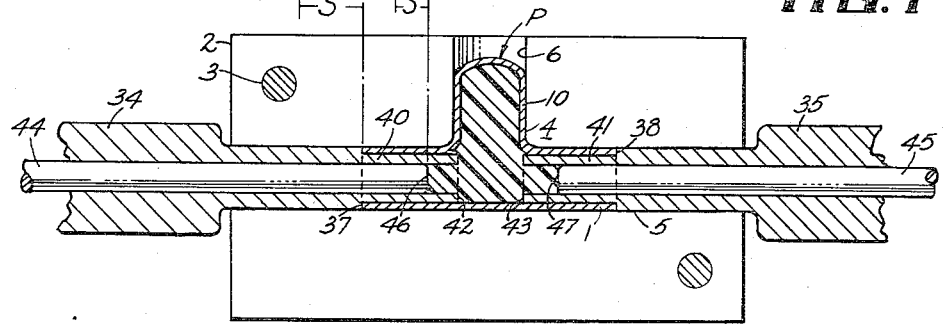
Figure 5 is a view corresponding to Figure 4 showing the end of the forming operation.

A modified form of my invention is illustrated in Figures 4 and 5 and contemplates the use of hollow plungers 34 and 35 similar in essential respects and functions to the plungers 19 and 20 of the form of Figures 1–3 and operated in substantially the same way, but differing in structure in that they are provided with walls of greater thickness than the thickness of the wall of the blank 1 whereby to be stronger than the plungers 19 and 20. Plungers 34 and 35 have pilot portions 40 and 41 respectively which extend into and closely fit the interior of the blank to support to the end portions of the blank internally while shoulders 37 and 38, which mark the juncture of the pilot portions 40 and 41 with the body of the respective plungers engage the ends of the blank. Since the outside diameter of the plungers is substantially the same as the O. D. of the blank, both blank and plungers fit snugly within the head recess 5 of the dies 2. The pilot portions fit snugly within the ends of the blank and the dimensions and area of the shoulders 37 and 38 are the same as the end faces of the blank. Rams 44 and 45 slide within the bores of the plungers 34 and 35 respectively and preferably in initial position take substantially the position shown in Figure 4, i. e., with their end faces 46 and 47 flush with the end faces 42 and 43 of the pilot portions of the plungers respectively wherewith to bear collectively on the square end of the right cylindrical slug of filler material 11.

In its general features of operation this modification is similar to the preferred form described above. Thus the plungers 34 and 35 are preferably adapted to be moved simultaneously toward each other and to contact the blank and correctly position it within the die before the forming takes place. Preferably also the rams 44 and 45, which again are independently movable with respect to the plungers, preferably impose a desirable preliminary pressure upon the filler material 11 which is confined within the blank, just prior to the beginning of the forming operation. It will be noted that one of the main distinctions of the present modification over the preferred form is that the hollow plungers not only impose flowing stresses upon the blank through their shoulders 37 and 38 but also through the end faces 42 and 43 of their pilot portions also impose pressure on and displace filler material 11. The rams 44 and 45 in this instance therefore do not have the whole burden of displacing filler material but share it with the plungers. For the same reasons the rate of displacement of filler material is not a direct and sole function of ram speed and movement but rather depends upon the speeds and movements of both the rams and plungers. Therefore while the plungers 34 and 35 move through a stroke S1, shown in Figure 5, equal to the stroke S1, shown in Figure 2, the rams 44 and 45 will have moved through a stroke S3 which will be smaller than the stroke S2, assuming that the blank 1 and the finished piece P are respectively the same in both instances. The amount by which the stroke S3 is less than the stroke S2 is proportionate to the relationship of the size of the rams 13 and 14 to the smaller sizes of the rams 44 and 45, and this follows from the fact that in the modification shown in Figures 4 and 5 the net displacement of filler material is a function of the differential between the rate of displacement of filler by the end areas of the ends of the pilots of the plungers and the end areas of the ends of the rams. Thus the stroke and average speed of the rams in this modification is to the stroke and average speed of the plungers as the volume of the finished piece P, less the volume of filler material displaced by the plungers, is to the initial volume of the blank 1. It will thus be seen that the stroke and movement of the rams, in this modification, being a function of the relative effective filler displacing area of the end faces of the rams compared to the effective filler displacing area of the end faces of the plungers may, depending on the relation of these areas and the net change of volume between the blank and the finished piece, be specifically greater or less than S3 as shown and may be zero or even be negative to fulfill the teachings and precepts of my invention. Under all circumstances, however, whether the rams move much or little or positively or negatively the rams always exert a desirable and/or desirably high and continuous pressure on the filler material substantially from the beginning through and to the end of the working stroke of the plungers wherewith to maintain the maximum useful pressure in and throughout the filler material to cause it to play substantially the same useful part in the working of the piece in substantially the same way described more fully in respect to the preferred form of my invention. That is to say, the quantity of filler material initially engaged between the ends of the rams and the ends of the plunger pilots will be completely confined and worked and subjected to a continuous substantially uniform pressure and induced to flow into the extruded branch 10 of the piece at the most desirable rate and under the most desirable substantially constant pressure.

When the areas of the ends of the rams are such in relation to areas of the ends of the pilots that the rams may exert their pressure on the filler without movement while the pilots displace the proper volume of filler material at the desired rate into the extruded leg, then the areas of the pilots may be expressed in the proportion: Cross-sectional area of filler material displaced by ends of pilots is to the whole internal cross-sectional area of the blank as the volume of finished piece P is to initial volume of the blank 1. The areas of the rams thereupon equals the difference between the cross-sectional area of the blank and the areas of the ends of the pilots. In this relationship the ends of the rams theoretically might initially be brought into end to end contact in the middle of a hollow slug of filler and remain in substantial contact throughout the working strokes since the pressure on and in the filler and the flow and displacement thereof induced by the pilots will substantially correspond to the intended optimum to facilitate working the piece without injury thereto; the filler material being entirely confined and held under a desirable pressure throughout the working stroke and none of the filler material being urged or permitted to flow other than in the direction of extension of metal toward and into the leg being formed. As will more fully appear below I have observed the mechanical problem of supporting the free ends of rams transversely in the stream of flow of filler material to the leg of a T and therefore refer to the above procedure as theoretical except in the instance of making crosses or other forms where the flow of filler transversely of the exposed end of rams is symmetrical.

Figure 6:
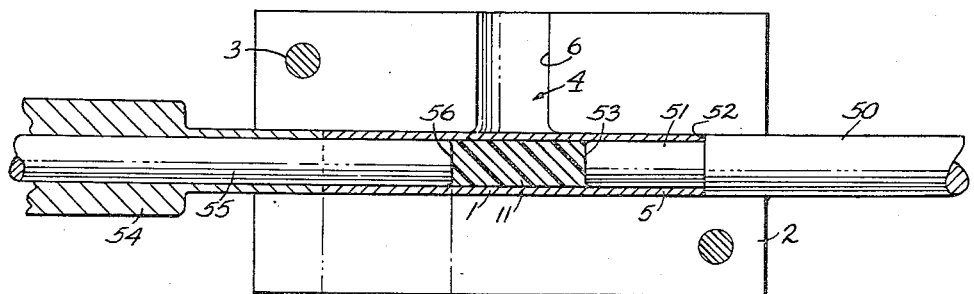
Figure 6 is a view similar to Figure 1 of another form of my invention with the apparatus at the beginning of the forming operation.
Figure 7:
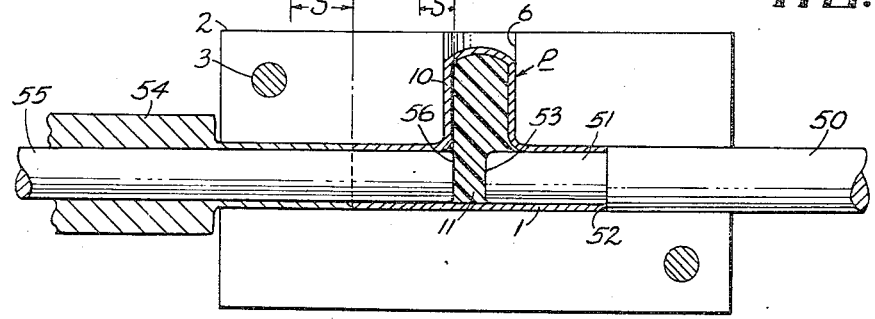
Figure 7 is a view corresponding to Figure 6 at the end of the forming operation.

The modified form of my invention shown in Figures 6 and 7 departs from the preferred form shown in Figures 1 and 2 in that while the hollow plunger 54 with the ram 55 may be substantially identical with the plunger 20 and ram 14, the oppositely disposed plunger 50 has an integrally formed pilot 51 extending into the blank 1 and closely fitting the interior of the blank and preferably occupying substantially the same position within the blank as the end of the pilot 13 in the initial working position, cf. Figures 1 and 7. In this modification the pilot portion 51 of the plunger 50 terminates in a square annular shoulder 52, the shoulder having a radial depth substantially equalling the thickness of the stock of the blank wherewith the plunger 50 will engage the right end of the blank through the shoulder 52. Preferably the pilot portion extends into the blank as far as practicable consistent with the length of the leg 10 to be extruded and the pilot terminates in a forward filler engaging face 53. The plunger 54 with the ram 55 independently movable therein is intended to be moved equally and oppositely of the plunger 50; the plungers 54 and 50 engaging the ends of the blank 1 and forcing the metal to flow in substantially the same way that the plungers 19 and 20 illustrated in Figure 1 act upon the metal of the blank. In this modification, however, the filler material 11 is engaged and confined between the end face 53 of the pilot 51 and the end face 56 of the ram 55 wherefore all of the compensation for the diminishing volume of the piece during the working thereof is effected by the proper differential speeds and movements between the single ram 55 and the hollow plunger 54. Inasmuch as the stroke of the pilot 51 is the same as the strokes S1 of the plungers, the stroke S4 of the ram 54 will be less than the stroke S2 of each of the rams 13 and 14 by an amount which is substantially twice the difference between the strokes S1 and S2 for the plungers 19 and 20 and the rams 13 and 14 respectively. In this form of my invention it is practicable to drive the plungers positively as by the hydraulic motors 24 and 26 shown in Figure 3 and to drive the ram 54 as by the pneumatic motor 28; preferably, as in the preferred form, maintaining a substantially constant maximum desirable pressure on the ram 54 from the beginning throughout the working stroke of the plungers. This form of my invention permits substantially the same operation and results as the preferred form and saves the employment of one of the motors or mechanisms for driving one of the independently movable rams.

In this as in the other forms of my invention I prefer to use a minimum gross volume of filler material consistent with my objects and purposes. In all of the forms and practice of my invention after the leg 10 of the piece P has been formed to its desired length the plungers are withdrawn; the halves of the die 2 separated and the piece ejected. Thereupon the filler material is removed and the closed end of the extruded branch shaped and/or trimmed as may be desired. If polyethylene glycol has been used in the forms which I prefer, its removal from the piece before or after trimming the end of the extruded branch is facilitated by the low melting point or the high solubility of the filler. The T or other branched form of finished piece, i. e., finished with respect to the primary formation thereof according to the instant invention, may thereafter be used directly or worked additionally as by forming sockets in the ends of the branches or otherwise according to known practices.

In all forms of my invention I exact a full measure of service and utility from the filler material in the working of the piece while avoiding the hazard of rupturing or injuring the piece as a consequence of the diminution of the volume thereof as between its initial and finished forms. In all forms of my invention I preserve the desirable differential between the rate of displacement of the ends of the blank toward each other and the rate or displacement of the filler material into the branch or branches being extruded, while maintaining on the filler material and between the filler material and the interior surfaces of the piece a desirably high hydrostatic pressure which however is retained below a deleterious value. In all forms of my invention the filler material is continuously confined within the piece and within the diminishing volume thereof and the mass of filler material as a whole is constrained to flow in the direction of the extrusion of the branch or branches wherewith to influence that extrusion favorably and to aid especially in the working and flowing of the metal around the corners of the intersection of the head with the legs or other branches of the finished piece. In all forms of my invention a desirably high initial pressure is created in the filler material and interiorly of the blank at or prior to the beginning of the direct working of the metal of the blank and the beneficiently high pressure is maintained continuously and substantially uniformly throughout the whole time of working the piece; the pressure in and exerted by the filler in and upon the piece never being subjected to sharp changes positively or negatively whether incident to intended relief or merely without control.

While I have illustrated and described preferred and modified forms of my invention and preferred and illustrative means with which the same may be practiced, changes, modifications and improvement therein will occur to those skilled in the art who come to understand the underlying and fundamental principles hereof and the teachings of this specification, and I do not care to be limited in the scope of my patent to the form or forms of my invention herein specifically illustrated and described or in any manner other than by the claims appended hereto.

I claim:

1. The method of forming a branch fitting from a tubular blank which comprises providing a quantity of flowable incompressible filler material in the intermediate portions of the blank, supporting the blank in a die having a straight passage in which the blank is received, and a branch passage connecting with said main passage into which material of the blank and filler material are to be worked to form the fitting, supporting the blank and filler material in the die against movement toward an end thereof, engaging the other end of the blank with an annular plunger, engaging the other end of the filler material with a ram fitting within the plunger, applying a force to the filler material by means of the ram to build up pressure within the filler material near to but less than that sufficient to burst the blank, positively moving the plunger against the end of the blank to shorten the blank and effect a flow of the material of the blank and filler material into the branch passage, and, during such movement of the plunger effecting movement of the ram entirely independently of the movement of the plunger to maintain the pressure within the blank substantially constant.

2. The method of forming a branch fitting from a tubular blank which comprises providing a quantity of flowable incompressible filler material in the intermediate portions of the blank, supporting the blank in a die having a straight passage in which the blank is received, and a branch passage connecting with said main passage into which material of the blank and filler material are to be worked to form the fitting, engaging both ends of the blank with annular plungers, engaging both ends of the filler material with rams fitting within the annular plungers, applying a force to the filler material by means of the rams to build up pressure within the filler material near to but less than sufficient to burst the blank, positively moving the plungers against the ends of said blank to shorten the blank and effect a flow of the material of the blank and filler material into the branch passage, and during such movement of the plungers, effecting movement of the rams entirely independently of the movement of the plungers to maintain the pressure within the blank substantially constant.

3. The method as defined in claim 2 in which the annular plungers have end surfaces shaped to engage and fit the ends of the blank, and the rams have end portions fitting snugly within the ends of the blank.

4. The method as defined in claim 2 in which the annular plungers have reduced end portions fitting snugly within the ends of the blank, and the rams have end surfaces engaging the filler material of substantially less diameter than the internal diameter of the blank.

5. In the method of reshaping a generally cylindrical metal tube into a fitting having a laterally extending branch portion, the steps comprising at least partially filling the tube with a plastic core material that is solid at room temperature and provides substantial frictional contact with the inner surface of the tube, supporting the tube in a die having a straight passageway in which the blank is received and a branch passageway connecting with the straight passageway into which the material of the tube and the core material are to be worked to form the fitting, engaging each end of the tube with an annular plunger, engaging each end of the core material with a ram fitting within the annular plunger and simultaneously moving both rams and plungers axially of the tube at different rates to apply force to the tube and core material to thereby displace a portion of the core material and a portion of the tube material laterally into said branch passageway, the rates of advance of said plungers and rams being controlled relative to one another such that the tube material is displaced into said branch passageway at a rate required to provide covering for the core material displaced into said branch passageway which is for the greater portion generally of uniform thickness and to thereby prevent rupturing of the tube.

6. The method called for in claim 5 wherein each end of the core material is moved a lesser distance than the ends of said tube.

7. The method called for in claim 5 wherein said plungers engage a portion of the ends of the core material as well as the ends of the tube.

8. The method of reshaping a generally cylindrical metal tube into a fitting having a laterally extending branch portion which comprises the steps of at least partially filling the tube with a plastic core material that is solid at room temperature and provides substantial frictional contact with the inner surface of the tube, positioning the tube in a die having a straight passageway in which the tube is received and a branch passageway connecting with the straight passageway into which the material of the tube and the core material are to be worked to form the fitting, engaging one end of the tube and core material with support means to oppose movement of the tube and core material out of the passageway by forces applied to the opposite end thereof, engaging the opposite end of the tube with an annular plunger, engaging the opposite end of the core material with a ram fitting within the annular plunger, and simultaneously moving both the ram and plunger axially of the tube at different rates to apply force to the tube and core material to thereby displace a portion of the core material and a portion of the tube material laterally into said branch passageway, the movement of said plunger and ram being controlled relative to one another such that the tube material is displaced into said branch passageway at a rate required to provide covering for the core material displaced into said branch passageway which is for the greater portion generally of uniform thickness and to thereby prevent rupturing of the tube.

9. The method defined in claim 8 in which said plunger engages a portion of the end of the core material as well as the end of the tube.

References Cited in the file of this patent
UNITED STATES PATENTS

| | | |
|---|---|---|
| 616,764 | Bourke | Dec. 27, 1898 |
| 2,027,285 | Parker | Jan. 7, 1936 |
| 2,111,695 | Seeber et al. | Mar. 22, 1938 |
| 2,203,868 | Gray et al. | June 11, 1940 |
| 2,206,741 | Cornell | July 2, 1940 |
| 2,331,430 | Shoemaker | Oct. 12, 1943 |
| 2,375,599 | Walton | May 8, 1945 |
| 2,603,175 | Wurzburger | July 15, 1952 |